(12) United States Patent
Zimmer et al.

(10) Patent No.: US 12,337,429 B2
(45) Date of Patent: Jun. 24, 2025

(54) MANUFACTURING CELL COMPRISING A TOOL CARRIER

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 441 days.

(21) Appl. No.: 17/775,474

(22) PCT Filed: Nov. 8, 2020

(86) PCT No.: PCT/DE2020/000271
§ 371 (c)(1),
(2) Date: May 9, 2022

(87) PCT Pub. No.: WO2021/089073
PCT Pub. Date: May 14, 2021

(65) Prior Publication Data
US 2022/0395942 A1 Dec. 15, 2022

(30) Foreign Application Priority Data
Nov. 10, 2019 (DE) .......................... 102019007762.8

(51) Int. Cl.
*B23Q 7/06* (2006.01)
*B23B 39/16* (2006.01)
(Continued)

(52) U.S. Cl.
CPC .............. *B23Q 1/012* (2013.01); *B23Q 1/66* (2013.01); *B23Q 3/088* (2013.01); *B23Q 7/046* (2013.01);
(Continued)

(58) Field of Classification Search
CPC ........... B23C 1/002; Y10T 409/307728; Y10T 409/308288; B23Q 39/029; B23Q 1/66;
(Continued)

(56) References Cited

U.S. PATENT DOCUMENTS 4,179,229 A * 12/1979 Kitagawa .............. B23B 41/003
408/39
5,163,793 A * 11/1992 Martinez ................ B23Q 1/037
409/219
(Continued)

FOREIGN PATENT DOCUMENTS

CN 101143467 A 3/2008
CN 203171150 U 9/2013
(Continued)

OTHER PUBLICATIONS

Machine Translation of CN 107159971-A, which CN '971 was published Sep. 2017.*

*Primary Examiner* — Erica E Cadugan
(74) *Attorney, Agent, or Firm* — Smartpat PLC

(57) ABSTRACT

A manufacturing cell comprises a machine tool that has a tool carrier carrying a tool unit and has two adjacent workpiece paths oriented in a longitudinal direction. The tool unit can be displaced relative to a machine bed of the machine tool in a transverse direction and in a vertical direction. At least one workpiece carriage per workpiece path can be displaced in the longitudinal direction along the machine tool. The tool unit can be displaced in the longitudinal direction relative to the machine bed and/or relative to the workpiece carriages. The tool carrier overhangs or projects beyond the workpiece paths. The individual workpiece carriage can also be displaced in the longitudinal direction along the workpiece supply. Furthermore, the workpiece supply has at least one lowerable or tiltable stop device per workpiece path.

14 Claims, 7 Drawing Sheets

(51) Int. Cl.
*B23Q 1/01* (2006.01)
*B23Q 1/66* (2006.01)
*B23Q 3/08* (2006.01)
*B23Q 7/04* (2006.01)
*B23Q 7/05* (2006.01)
*B23Q 7/14* (2006.01)
*B23Q 16/00* (2006.01)
*B23Q 39/02* (2006.01)
*B23Q 39/04* (2006.01)
*B23C 1/12* (2006.01)
*B23P 23/02* (2006.01)
*B23P 23/04* (2006.01)
*B23Q 1/03* (2006.01)

(52) U.S. Cl.
CPC .............. *B23Q 7/05* (2013.01); *B23Q 7/06* (2013.01); *B23Q 7/1421* (2013.01); *B23Q 16/001* (2013.01); *B23Q 39/024* (2013.01); *B23Q 39/029* (2013.01); *B23Q 39/04* (2013.01); *B23B 39/16* (2013.01); *B23C 1/12* (2013.01); *B23P 23/02* (2013.01); *B23P 23/04* (2013.01); *B23Q 1/035* (2013.01); *B23Q 1/037* (2013.01); *B23Q 2707/05* (2013.01); *Y10T 29/5107* (2015.01); *Y10T 29/5196* (2015.01); *Y10T 409/307672* (2015.01); *Y10T 409/308176* (2015.01); *Y10T 409/308288* (2015.01); *Y10T 409/308344* (2015.01); *Y10T 409/308736* (2015.01)

(58) Field of Classification Search
CPC ........... B23Q 1/012; B23Q 7/05–7/055; B23Q 16/001; B23Q 3/088; B23Q 2703/04; B23Q 1/035; B23Q 1/037; B23B 39/006; B24B 7/005; B24B 7/224; B23K 37/0235; B65G 47/8815; B65G 47/8823; B25B 11/005
USPC .................................... 409/202, 212; 269/21
See application file for complete search history.

(56) References Cited

U.S. PATENT DOCUMENTS

| | | |
|---|---|---|
| 5,170,876 A | 12/1992 | Sticht |
| 6,067,695 A | 5/2000 | Momoitio |
| 6,764,434 B1 | 7/2004 | Volk |
| 2002/0074703 A1 | 6/2002 | Schmalz et al. |
| 2012/0195718 A1 | 8/2012 | Grob et al. |
| 2017/0297218 A1 | 10/2017 | Friese et al. |
| 2018/0015633 A1* | 1/2018 | Bacci ................ B23Q 39/04 |
| 2018/0250781 A1 | 9/2018 | Gauli |
| 2020/0061763 A1* | 2/2020 | Gauli ................ B23Q 1/032 |
| 2021/0129271 A1 | 5/2021 | Süss |
| 2022/0379417 A1* | 12/2022 | Zimmer ................ B27M 1/08 |
| 2022/0379464 A1* | 12/2022 | Zimmer ................ B25J 11/005 |

FOREIGN PATENT DOCUMENTS

| | | | |
|---|---|---|---|
| CN | 204036024 U | | 12/2014 |
| CN | 105437177 A | | 3/2016 |
| CN | 102626884 B | | 8/2016 |
| CN | 107159971 A | * | 9/2017 |
| CN | 107649790 A | | 2/2018 |
| CN | 109676704 A | | 4/2019 |
| CN | 110087824 A | | 8/2019 |
| CN | 110355830 A | | 10/2019 |
| CN | 110385557 A | | 10/2019 |
| CN | 107243742 B | | 3/2023 |
| DE | 29807071 U1 | | 7/1998 |
| DE | 10009026 C1 | | 7/2001 |
| DE | 20309779 U1 | | 9/2003 |
| DE | 10214554 A1 | | 10/2003 |
| DE | 102004053519 | | 5/2006 |
| DE | 102006027013 | | 1/2008 |
| DE | 102007044589 A1 | | 4/2008 |
| DE | 202011002384 U1 | | 5/2012 |
| DE | 102015212541 A1 | | 3/2016 |
| DE | 102017012077 A1 | | 7/2018 |
| DE | 102017104246 A1 | | 9/2018 |
| EP | 0835720 A1 | | 4/1998 |
| EP | 1188697 A1 | | 3/2002 |
| EP | 1810803 A1 | | 7/2007 |
| EP | 2392439 A1 | * | 12/2011 |
| EP | 2153955 B1 | | 12/2012 |
| EP | 3750677 A1 | | 12/2020 |
| EP | 3819080 A1 | * | 5/2021 |
| ES | 2146138 | | 7/2000 |
| FR | 3056932 A1 | | 4/2018 |
| JP | 2009178797 A | | 8/2009 |
| WO | 03097296 A1 | | 11/2003 |
| WO | 2014177997 A1 | | 11/2014 |
| WO | WO-2024/134530 A1 | * | 6/2024 |

* cited by examiner

MANUFACTURING CELL COMPRISING A TOOL CARRIER

TECHNICAL FIELD

The disclosure relates to a manufacturing cell comprising a machine tool that has a tool carrier carrying at least one tool unit and has two adjacent workpiece paths oriented in a longitudinal direction.

BACKGROUND

A manufacturing cell is disclosed in FR 3 056 932 A1. In it, two workpieces fixed on coupled carriages are machined simultaneously by means of two tool units arranged on a gantry.

SUMMARY

The present disclosure provides an increased output rate of a manufacturing cell while maintaining a high degree of flexibility.

The manufacturing cell comprises a machine tool that has a tool carrier carrying at least one tool unit and has two adjacent workpiece paths oriented in a longitudinal direction. The tool unit can be displaced relative to a machine bed of the machine tool at least in a transverse direction oriented normal to the longitudinal direction and in a vertical direction oriented normal to these two directions. At least one workpiece carriage per workpiece path can be displaced in the longitudinal direction along the machine tool. The tool unit can be displaced in the longitudinal direction relative to the machine bed and/or relative to the workpiece carriages.

The tool carrier overlaps or projects beyond the workpiece paths, which each have a workpiece supply region of a workpiece supply and a working region of the machine tool. The individual workpiece carriage can also be displaced in the longitudinal direction along the workpiece supply. Furthermore, the workpiece supply has at least one lowerable or tiltable stop device per workpiece path.

The manufacturing cell has two parallel workpiece paths along which a workpiece to be machined is conveyed. The convey devices of both workpiece paths have workpiece carriages that guide the workpiece to be machined. Such workpiece carriages can be displaced independently of one another in the longitudinal direction of the manufacturing cell. The tool carrier overhangs or projects beyond both workpiece paths, such that the single tool unit can be used to machine a workpiece on the first workpiece path and to machine a workpiece on the second workpiece path. The supply of a second workpiece and the displacement of such second workpiece into the working region of the machine tool can take place during the machining of a first workpiece. Since the machining operations on the individual workpieces are independent of one another, a high output rate can be achieved even with a batch size of one.

The manufacturing cell can be designed for manual or automatic workpiece loading and unloading. It can be arranged individually in the material flow or—in the case of an interlinked manufacturing process—integrated into one manufacturing line. Such an interlinked manufacturing process can designed to be rigid or flexible. In this case, the manufacturing cell can be designed in such a way that it enables complete machining of the workpiece without reclamping.

Further details will be apparent from the claims and the following description of schematically illustrated embodiments.

DETAILED DESCRIPTION

Figure 1:
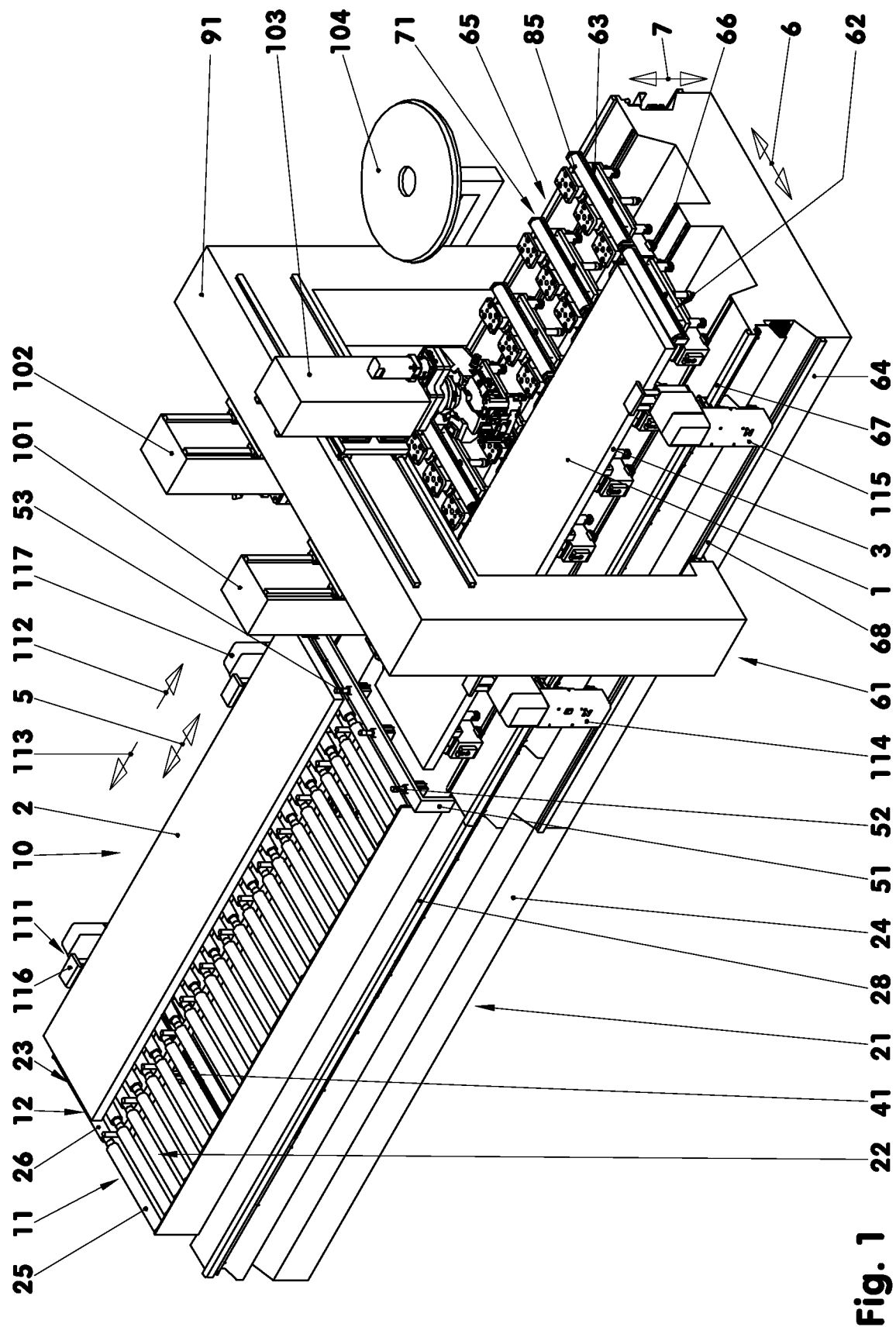
FIG. 1: Manufacturing cell.

FIGS. 1-8 show a manufacturing cell (10) and some of its assemblies. The manufacturing cell (10) shown includes a workpiece supply (21) and a machine tool (61) interlinked with the workpiece supply (21). The individual workpieces (1; 2) to be machined by means of the machine tool (61) are conveyed by means of a conveyor device (111) from the workpiece supply (21) to the machine tool (61) and to the workpiece removal unit. In the exemplary embodiment, the workpiece removal takes place after machining in the workpiece supply region (21). However, it is also conceivable to arrange the respective workpiece removal unit in a manner spatially separate from the workpiece supply (21). The workpiece (1; 2) is transported from the workpiece supply (21) to the machine tool (61) in a first conveying direction (112). For removal, the workpiece (1; 2) in this exemplary embodiment is transported in a second conveying direction (113) directed against such first conveying direction (112). The conveying directions (112, 113) are oriented in the longitudinal direction (5) of the manufacturing cell (10).

The manufacturing cell (10) has two workpiece paths (11, 12). These are located next to one another. They have the same longitudinal direction (5). Each of the workpiece paths (11; 12) has a workpiece supply region (22; 23) and a working region (62; 63). The working region (62; 63) is arranged in the machine tool (61). The respective working region (62; 63) is the, for example, cuboid-shaped spatial region in which the individual workpiece (1; 2) interacts with the machining tool unit (101-104).

Figure 2:
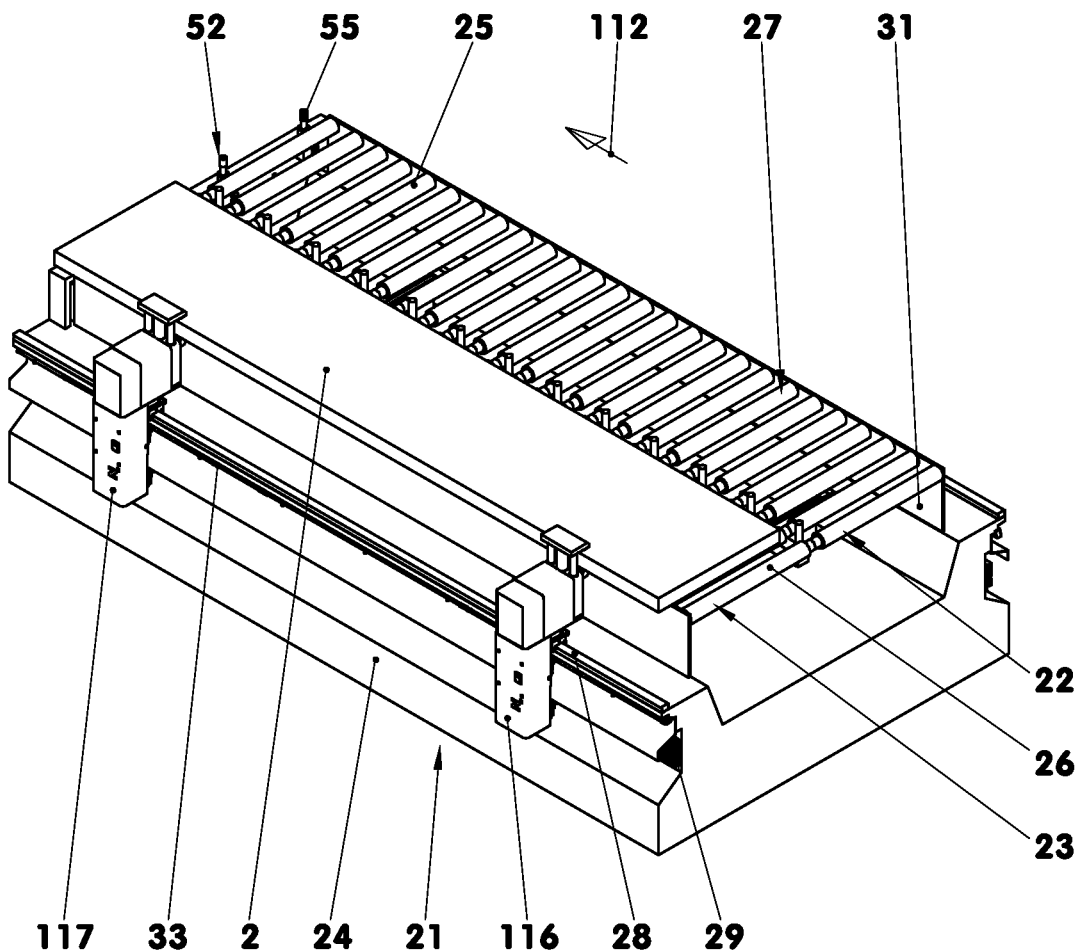
FIG. 2: Workpiece supply.

In the exemplary embodiment, the workpiece supply (21), see FIG. 2, comprises a bed (24) that supports two adjacent load-bearing roller paths (25, 26), a transverse thrust device (41) and two stop devices (52, 53) seated, for example, on a common stop bar (51). The bed (24) has external workpiece carriage guide rails (28) and conductor paths (29). These continue on the machine bed (64) of the machine tool (61). Workpiece carriages (114-117) of the conveyor device (111) can be displaced along the workpiece carriage guide rails (28). In the exemplary embodiment, the conveyor device (111) comprises two workpiece carriages (114, 115; 116, 117) per workpiece path (11; 12). The power supply and control of the self-propelled workpiece carriages (114-117) is provided by means of the conductor paths (29). It is also conceivable to use only one workpiece carriage (114; 115; 116; 117) per workpiece path (11; 12).

The single load-bearing roller path (25; 26) comprises a plurality of load-bearing rollers (27) lying transverse to the conveying direction (112) and parallel to one another. These can be of rigid design or, for example, can be arranged on a rigid axle in rolling bearings. In the exemplary embodiment, all load-bearing rollers (27) are identical to one another. The width of the individual load-bearing roller (27) is generally greater than or equal to the maximum width of a workpiece (1; 2) to be machined in the transverse direction (6). The load-bearing rollers (27) project beyond the lateral load-bearing roller supports (31) oriented in the longitudinal direction (5) in the height direction (7).

Figure 3:
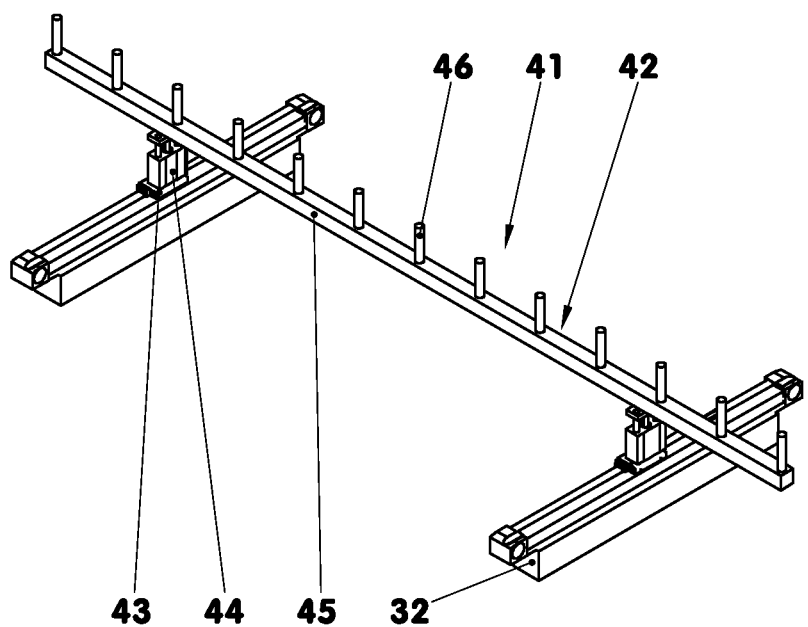
FIG. 3: Transverse thrust device.

FIG. 3 shows a transverse thrust device (41). In the exemplary embodiment, this has a rake (42) that can be displaced in the transverse direction (6). The transverse thrust device (41) has two transverse guides (32) anchored in the bed (24), each of which carries a transverse slide (43) that can be displaced relative thereto. The stroke of the transverse slide (43) in the transverse direction (6) is, for example, 40% greater than the width of a load-bearing roller path (25; 26) in such direction. The two transverse slides (43) are driven synchronously with one another, for example. A lifting device (44) which acts on a height-adjustable tine carrier (45) of the rake (42) oriented in the longitudinal direction (5) sits on each of the transverse slides (43). Both, for example, hydraulically operated lifting devices (44) are coupled, such that the tine carrier (45) is always horizontal. Tines (46) project upwards from the tine carrier (45). In the exemplary embodiment, the tines (46) are cylindrical pins. When the rake (42) is mounted and raised, the tines (46) are positioned, for example, between two load-bearing rollers (27) of a load-bearing roller path (25; 26). The lifting devices (44) are designed in such a way that, when the tines (46) are extended, they project beyond the supporting plane of the load-bearing roller path (25; 26) by 70% of the stroke. When the lifting device (44) is lowered, the tines (46) are recessed below the supporting plane of the load-bearing roller path (25; 26). The supporting plane of the load-bearing roller path (25; 26) tangent to the upper side of the load-bearing roller path (25; 26) is also referred to below as the conveying plane of the manufacturing cell (10). Instead of a rake (42), the transverse thrust device (41) can also have a pivoting lever, a thrust wedge, etc.

Figure 4:
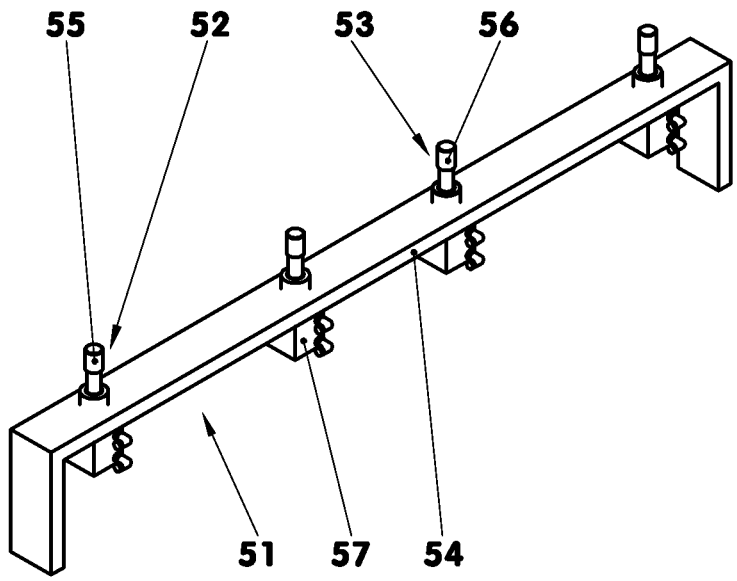
FIG. 4: Stop bar.

FIG. 4 shows a stop bar (51). This is oriented in the transverse direction (6) and is arranged at the end of the workpiece supply (21) turned towards the machine tool (61). The stop bar (51) has a pin carrier (54) that supports two stop devices (52, 53), each with two stop pins (55; 56). Each stop pin (55; 56) is adjustable between a retracted and an extended position by means of a double-acting cylinder (57). In the extended position shown, the stop pins (55, 56) project 85% of their vertical stroke beyond the conveying plane. In the retracted position, the stop pins (55, 56) are below the conveying plane. The stroke adjustment of the hydraulic cylinders (57) is carried out, for example, in groups per stop device (52; 53).

Figure 5:
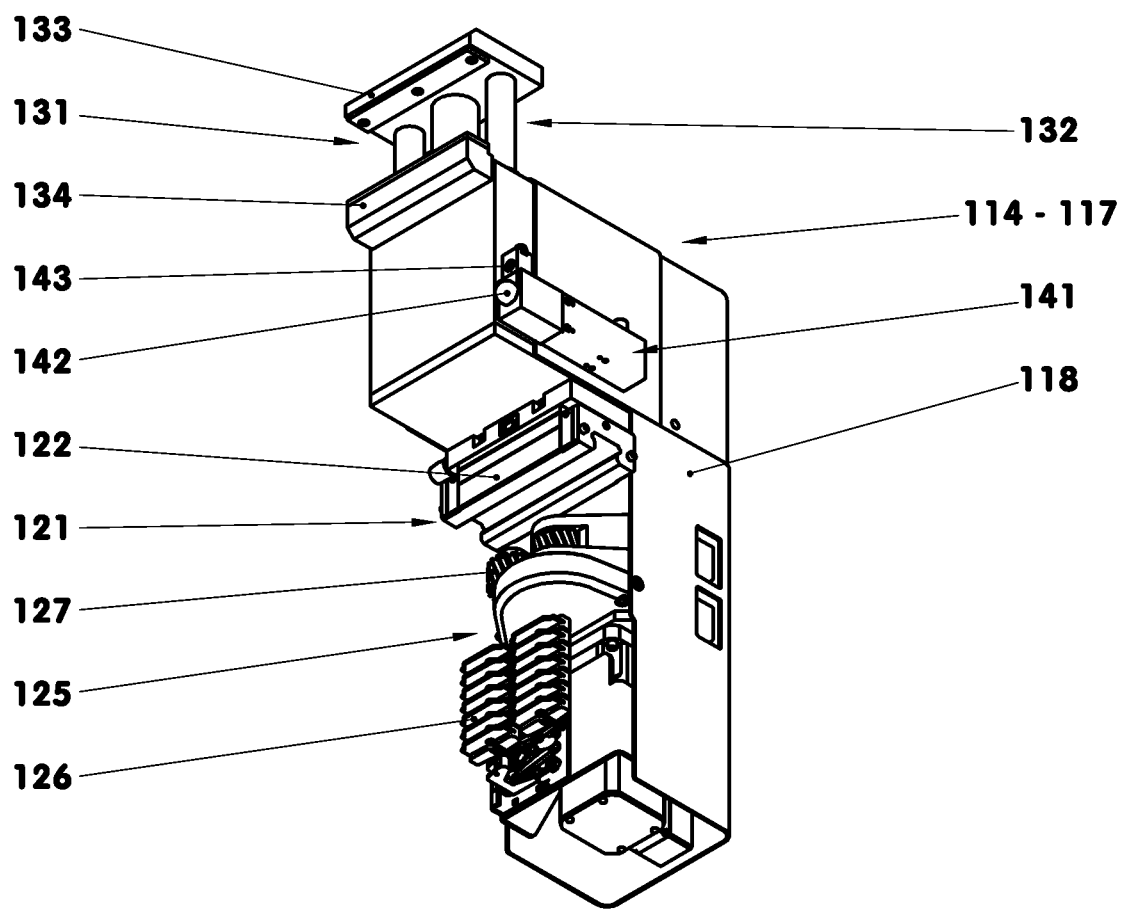
FIG. 5: Workpiece carriage.

FIG. 5 shows a workpiece carriage (114; 115; 116; 117). The manufacturing cell (10) shown in the exemplary embodiment has four workpiece carriages (114-117) of the same kind. Two of such workpiece carriages (114, 115) are guided along the right side of the manufacturing cell (10) as seen in the conveying direction (112), while the two other workpiece carriages (116, 117) are guided along the left side. It is also possible to use more or fewer than the number of workpiece carriages (114-117) shown.

The individual workpiece carriage (114; 115; 116; 117) has a guide unit (121), a drive unit (125) and a gripping unit (131). The above units (121, 125, 131) are integrated in a housing (118). In the exemplary embodiment, a docking coupling (141) is arranged on the external side of the housing (118).

The guide unit (121) comprises a recirculating ball bearing unit (122) that, when the workpiece carriage (114; 115; 116; 117) is mounted, engages around the workpiece carriage guide rail (28) of the workpiece supply (21) and/or the workpiece carriage guide rail (67) of the machine tool (61). In this case, the workpiece carriage guide rails (28, 67) are fastened in the longitudinal direction (5) oriented on the bed (24) of the workpiece supply (21) or on the machine bed (64) of the machine tool (61).

The drive unit (125) has a power and signal supply (126). When the workpiece carriage (114; 115; 116; 117) is mounted, this is in spring-loaded contact with the conducting paths (29) of the bed (24) or the machine bed (64). A drive motor arranged in the workpiece carriage (114; 115; 116; 117) drives a drive wheel (127) that, when the workpiece carriage (114; 115; 116; 117) is mounted, meshes with a toothed rack (33) fastened laterally to the bed (24) or to the machine bed (64).

The gripping unit (131) is arranged above the guide unit (121). It comprises a parallel gripping device (132) with two clamping jaws (133, 134) movable relative to one another. In the exemplary embodiment, both clamping jaws (133, 134) are displaceable relative to the housing (118) of the workpiece carriage (114; 115; 116; 117). The opening and closing directions of the parallel gripping device (132) are oriented in the height direction (7). A height adjustment of the entire gripping unit (131) relative to the guide unit (121) is also conceivable. Both clamping jaws (133, 134) can also be adjusted in height in an individually driven manner.

The gripping unit (131) can also be asymmetrical. For example, the lower clamping jaw (134) can have a shorter stroke than the upper clamping jaw (133).

For example, the docking coupling (141) has a retractable plunger (142) and a plug (143). The plug (143) can be used to transmit electrical power, data and/or media, for example compressed air for pneumatic functions. In the exemplary embodiment, a suction block assembly (71) of the machine tool (61) can be coupled to the docking coupling (141). The single workpiece carriage (114; 115; 116; 117) can also be formed without the docking coupling (141).

Figure 6:
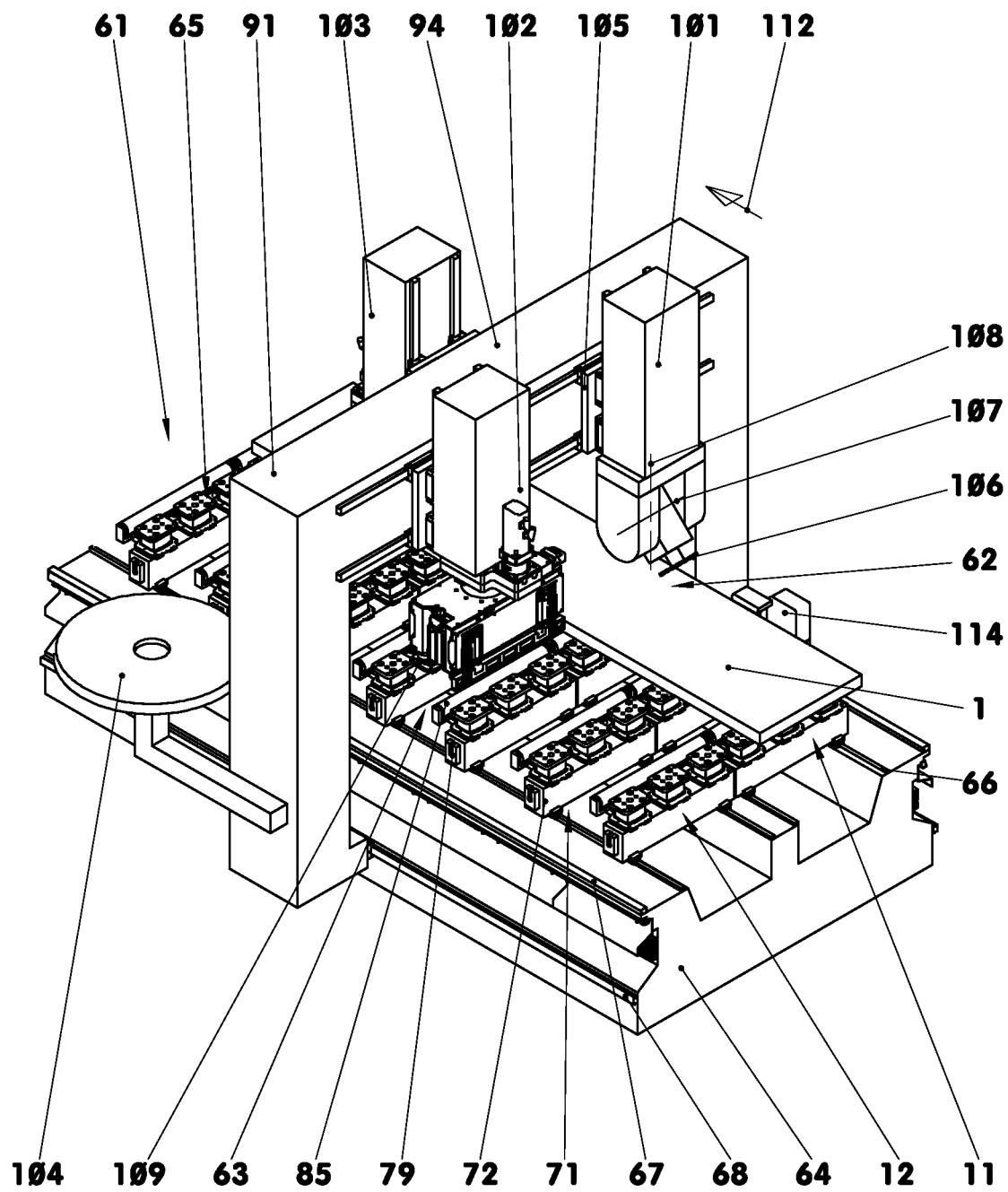
FIG. 6: Machine tool.

FIG. 6 shows the machine tool (61) of the manufacturing cell (10). Two workpiece tables (65) are arranged side by side in the machine bed (64). The parting line of the two workpiece tables (65) runs in the vertical center longitudinal plane of the machine bed (64). Each of the workpiece tables (65) includes a plurality of suction block assemblies (71). The individual suction block assemblies (71) are guided in the machine bed (64) so that they can be displaced in the longitudinal direction (5). The machine bed (64) has suction block guide paths (66) oriented in the longitudinal direction (5) for this purpose. Furthermore, a chip removal device can be arranged in the machine bed (64).

Figure 7:
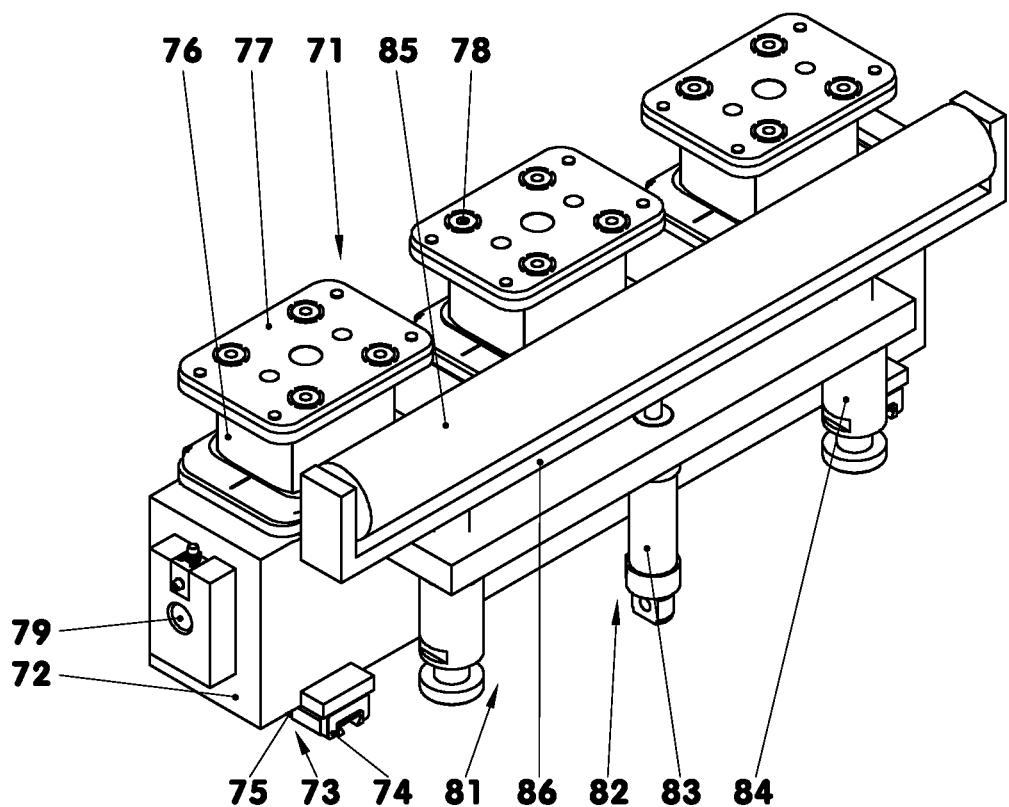
FIG. 7: Suction block assembly.

FIG. 7 shows a suction block assembly (71). All suction block assemblies (71), for example, are constructed in the same way. The individual suction block assembly (71) has a support beam (72) with two guide assemblies (73) for guidance along the machine bed (64). The individual guide assembly (73) has two guide shoes (74) spaced apart in the longitudinal direction (5), between which a hydraulically or pneumatically releasable clamping device (75) is located. This, for example, spring-loaded closing clamping device (75) secures the position of the suction block assembly (71) relative to the machine bed (64) in the longitudinal direction (5).

The support beam (72) is oriented in the transverse direction (6). For example, it carries three suction elements sitting next to one another (76). These have an approximately rectangular suction surface (77) with four suction cups (78). In the exemplary embodiment, the suction elements (76) are designed to be individually adjustable in height. However, they can also be designed to be rigid. Each suction element (76) and/or suction cup (78) can be controlled individually with negative pressure.

A support device (81) is arranged on the support beam (72). This support device (81) has a lifting device (82) that has a central lifting cylinder (83) and two guide cylinders (84). The lifting device (82) carries a transverse support roller (85). The support roller (85) is rotatably mounted in a U-shaped support beam (86), for example. A rigid arrangement of the individual support roller (85) is also conceivable. The lifting device (82) is designed in such a way that the support plane lying parallel to the conveying plane and tangent to the upper surface line of the support roller (85) can be adjusted from a standby position lying below the suction surface (77) to a support position lying above the suction surface (77).

A support beam coupling (79) is arranged at the end face of the support beam (72). This is designed, for example, to complement the docking coupling (141) of the workpiece carriages (114-117).

Gantry guide rails (68) are arranged below the workpiece carriage guide rails (67) on the external side of the machine bed (64). The gantry guide rails (68) guide a tool carrier (91) in the form of a tool gantry (91), which in the exemplary embodiment carries three tool units (101; 102; 103). The tool gantry (91) can be displaced along the machine bed (64) in the longitudinal direction (5) by means of a drive device (not shown here). The drive unit of the tool gantry (91) can, for example, be designed like the drive unit (125) of the workpiece carriages (114-117). However, a drive by means of a ball screw, a gear drive, etc. is also conceivable. If necessary, the respective position of the tool gantry (91) can be secured by means of a clamping device. The tool gantry (91) straddles both workpiece paths (11, 12). In this exemplary embodiment, it is located outside the workpiece carriages (114-117), such that they can be displaced unhindered within the tool gantry (91).

Figure 8:
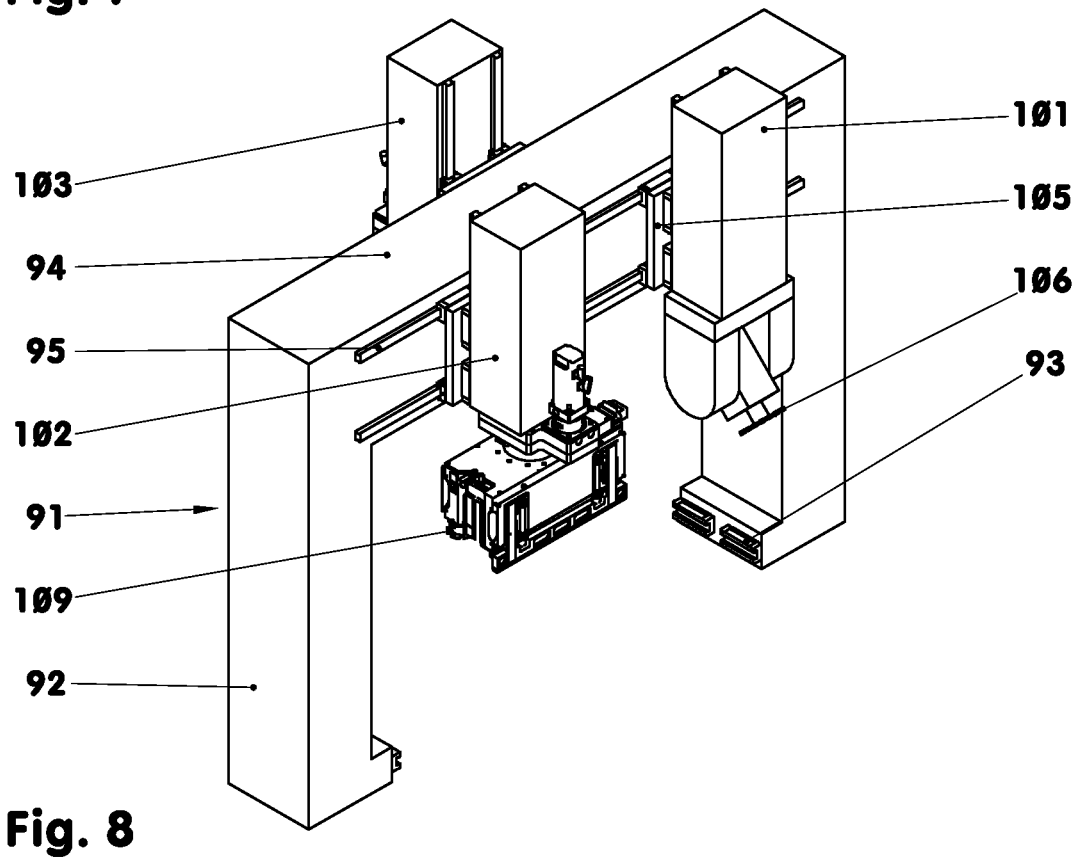
FIG. 8: Tool gantry.

FIG. 8 shows the tool gantry (91). The tool gantry (91) has a U-shaped gantry carrier (92). Recirculating ball bearing units (93), for example, which engage around the gantry guide rails (68), are arranged at the free ends of the gantry carrier (92). The upper central beam (94) of the gantry carrier (92) supports the tool units (101-103). For this purpose, the central beam (94) has support and guide rails (95) running in the transverse direction (6). The support and guide rails (95) are arranged on both end faces of the central beam (94) pointing in the longitudinal direction (5). Each of the tool units (101-103) shown is mounted on such support and guide rails (95). Thus, the individual tool unit (101-103) can be displaced in the transverse direction (6) and in the height direction (7) oriented normal to the conveying plane. Each of the tool units (101-103) can additionally be designed to be displaced relative to the tool gantry (91) in the longitudinal direction (5). All tool units (101-103) can machine workpieces (1; 2) on both workpiece paths (11, 12).

The tool carrier (91) can also be designed to be L-shaped. It is then mounted on one side of the machine bed (64) so that it can be displaced, for example, and projects beyond both workpiece paths (11, 12). With one such embodiment, the workpiece carriages (114, 115; 116, 117) of at least one workpiece path (11; 12) travel between the machine bed (64) and the tool carrier (91).

The tooling units (101-103) shown in the exemplary embodiment are a 5-axis head (101), a drilling unit (102) and a gluing unit (103). In the exemplary embodiment, the 5-axis head (101) carries a driven disk milling cutter (106) that can be pivoted about a horizontal pivot axis (107). Furthermore, such unit can be pivoted or rotated about a vertical axis (108).

The drilling unit (102) has a plurality of drilling and milling tools (109) that can be brought into individual engagement with the workpiece, for example. The drilling unit (102) is designed to swivel about a vertical axis, for example.

On the side of the tool gantry (91) turned away from the 5-axis head (101) and the drilling unit (102), the latter carries the gluing unit (103). The gluing unit (103) can be used, for example, to apply a workpiece coating to the workpiece (1; 2).

An edge gluer (104) is also arranged on the workpiece gantry (91). This can be used to coat the edges of the workpiece (1; 2).

In the manufacturing cell (10), for example, no workpiece (1; 2) is initially provided in the workpiece supply (21). At least two workpiece carriages (114, 115; 116, 117) are positioned on one side in the region of the workpiece supply (21). The gripping units (131) of such workpiece carriages (114, 115; 116, 117) are open. The rake (42) of the transverse thrust device (41) is lowered. A first workpiece (1; 2) is deposited in the workpiece supply (21), for example by means of a hall conveyor device. Such first workpiece (1; 2) is designed to be, for example, plate-shaped. It consists, for example, of wood, plastic, aluminum, steel, a composite material, etc. The deposited workpiece (1; 2) is only roughly oriented when deposited, for example. For example, the longitudinal direction of the workpiece can deviate by 30 degrees from the longitudinal direction (5) of the manufacturing cell (10).

After the first workpiece (1; 2) has been deposited, the rake (42) travels in the transverse direction (6) until it is on the side of the workpiece (1; 2) turned away from the workpiece carriages (114, 115; 116, 117). The lifting devices (44) then lift the tine carrier (45) and the tines (46) until the tines (46) project above the conveying plane. Now, the rake (42) can move the first workpiece (1; 2) in the direction of the gripping units (131) of the workpiece carriages (114, 115; 116, 117) until the workpiece (1; 2) lies between the clamping jaws (133, 134). In this case, the workpiece (1; 2) is aligned in such a way that the longitudinal side (3) of the workpiece received in the gripping units (131) is oriented in the longitudinal direction (5) of the manufacturing cell (10).

The manual loading and/or alignment of the workpiece (1; 2) is also conceivable. In this case, the workpiece (1; 2) deposited on the load-bearing rollers (27) is pushed by the operator to the workpiece carriages (114, 115; 116, 117) of the workpiece path (11; 12) provided for machining.

After the gripping units (131) have been closed, the workpiece carriages (114, 115; 116, 117) pull the workpiece (1; 2) along the load-bearing rollers (27) in the conveying direction (112) until the workpiece (1; 2) rests against at least one stop pin (55; 56) of the workpiece path (11; 12). It is also conceivable that, when the gripping units (131) are closed, the workpiece (1; 2) is lifted off the load-bearing roller path (25; 26) by a small amount, for example less than five millimeters. For example, it is then parallel to the conveying plane. From the workpiece position at the stop device (52; 53) and the position of the workpiece carriages (114, 115; 116, 117) relative to the bed (24) in the longitudinal direction (5), the position of the workpiece (1; 2) relative to the workpiece carriages (114, 115; 116, 117) can be determined.

In the machine tool (61), for example, free workpiece carriages (114, 115; 116, 117) or adjustment carriages are used to adjust the position of the suction block assemblies (71) in the longitudinal direction (5). When using adjustment carriages, for example, these are constructed in the same way as the workpiece carriages (114-117), but do not have a gripping unit (131). To adjust the individual suction block assembly (71), a workpiece carriage (114; 115; 116; 117) couples to a suction block assembly (71) by means of the docking coupling (141). The clamping of the suction block assembly (71) to the suction block guide path (66) is released and the workpiece carriage (114; 115; 116; 117) displaces the suction block assembly (71) to the desired position specific to the workpiece. Furthermore, those suction elements (76) which are located in the region of the workpiece (1; 2) to be machined are lowered. This prevents, for example, damage to the suction block assembly (71) during the cutting machining of the workpiece (1; 2). The workpiece carriage (114; 115; 116; 117) is then uncoupled from the suction block assembly (71) and the clamping device (75) of the suction block assembly (71) is activated on the machine bed (64).

The suction block assemblies (71) can also be adjusted by means of the workpiece carriages (114, 115; 116, 117) conveying the workpiece (1; 2). For this purpose, for example, after the workpiece (1; 2) has been deposited on the support rollers (85), the gripping unit (131) of a workpiece carriage (114; 115; 116; 117) is opened while at least one other workpiece carriage (115; 114; 117; 116) holds the workpiece (1; 2). By means of the free workpiece carriage (114; 115; 116; 117), one or more of the suction block assemblies (71) can now be adjusted. After clamping the workpiece (1; 2) again by means of such workpiece carriage (114; 115; 116; 117), another workpiece carriage (115; 114; 117; 116) can be used to adjust additional suction block assemblies (71).

The suction block assemblies (71) can also be displaced individually relative to the machine bed (64). For this purpose, for example, each suction block unit (71) has a drive unit that rolls, for example, on a toothed rack on the machine bed side. With such an embodiment, the docking couplings (141) of the workpiece carriages (114; 115; 116; 117) and the support beam couplings (79) of the suction block assemblies (71) can be omitted. For example, the adjustment of the suction block assemblies (71) in the longitudinal direction (5) takes place in a manner specific to the workpiece during the alignment of the workpiece (1; 2) to be machined in the workpiece supply (21).

After lowering the stop pins (55; 56) of the first workpiece path (11; 12), the workpiece carriages (114, 115; 116, 117) displace the first workpiece (1; 2) further in the conveying direction (112) to the machine tool (61). Here, the workpiece carriages (114; 115; 116; 117) are stopped, such that the workpiece (1; 2) lies on the support rollers (85) at the provided position in the respective working region (62; 63) of the machine tool (61). Then, for example, the suction elements (76) are raised and/or the support rollers (85) are lowered until the workpiece (1; 2) lies on the designated suction elements (76). The support rollers (85) are lowered further until they are below the working region (62; 63) of the tool units (101-103).

It is also conceivable to lift the support rollers (85) after positioning the workpiece carriages (114, 115; 116, 117), such that the respective workpiece (1; 2) lies on the support rollers (85) after opening the gripping elements (131). The support rollers (85) are then lowered by means of the support roller lifting devices (82) until they are below the support plane. In this case, the workpiece (1; 2) is deposited on the suction elements (76). In this case, the height-adjustable gripping units (131), for example, can continue to hold the workpiece (1; 2).

By means of a vacuum pump, which acts on the suction cups (78) covered by the workpiece (1; 2) and resting on the workpiece (1; 2), the first workpiece (1; 2) is fixed in the machining position. In this case, for example, the lifting devices of the gripping units (131) are lowered as the negative pressure increases. After fixing the workpiece (1; 2) by means of the suction elements (76), the gripping units (131) can be released from the workpiece (1; 2) if necessary. The workpiece (1; 2) can now be machined by means of the tool units (101-103) and the edge gluer (104). In this case, for example, all the tool units (101-103) arranged on the tool gantry (91) and the edge gluer (104) can be used to machine a workpiece (1; 2). For example, it is conceivable to machine the workpiece (1; 2) completely in one clamping operation.

While the first workpiece (1; 2) is being machined, a second workpiece (2; 1) can be provided. The workpiece carriages (116, 117; 114, 115) of the second workpiece path (12; 11) are used for this purpose. The second workpiece (2; 1) is provided as described above in connection with the first workpiece (1; 2). The second workpiece (2; 1) can already be displaced into the working region (63; 62) while the first workpiece (1; 2) is being machined. Another sequence of the supply and machining of the workpieces (1; 2) is also conceivable.

After machining the first workpiece (1; 2), for example, the vacuum pump is switched off and the pressure at the suction surfaces (77) is increased to ambient pressure. The gripping elements (131) grip the workpiece (1; 2) or continue to hold the gripped workpiece (1; 2). The support rollers (85) are raised and/or the suction elements (76) are lowered until the support plane is above the suction elements (76). The workpiece carriages (114, 115; 116, 117) displace the machined workpiece (1; 2), for example, in the second conveying direction (113) for workpiece removal, which in the exemplary embodiment takes place in the workpiece supply region (22; 23). It is also conceivable to convey the machined workpiece (1; 2) further in the first conveying direction (112), for example to a further manufacturing cell.

When arranging the manufacturing cell (10) in a linked manufacturing process, it is conceivable to hold the gripping units (131) on the workpiece (1; 2) during the entire machining process. This eliminates the need to reposition the workpiece in a subsequent manufacturing cell (10).

The first workpiece (1) and the second workpiece (2) can also be machined in a manner parallel to one another. For example, for identical work processes, the workpiece gantry (91) can have two identically designed tool units (101, 101; 102, 102; 103, 103). It is also conceivable, for example, that a milling operation is carried out on one workpiece (1; 2) while a drilling unit is used intermittently on the other workpiece (2; 1).

The workpiece (1; 2) to be machined can also be wider than a single workpiece path (11; 12). For example, it then projects into the other workpiece path (12; 11). The machining of such a workpiece (1; 2) is carried out as described above. In this case, the following workpiece (2; 1) does not travel into the working region (62; 63) until the preceding workpiece (1; 2) has left both working regions (62; 63).

Figure 9:
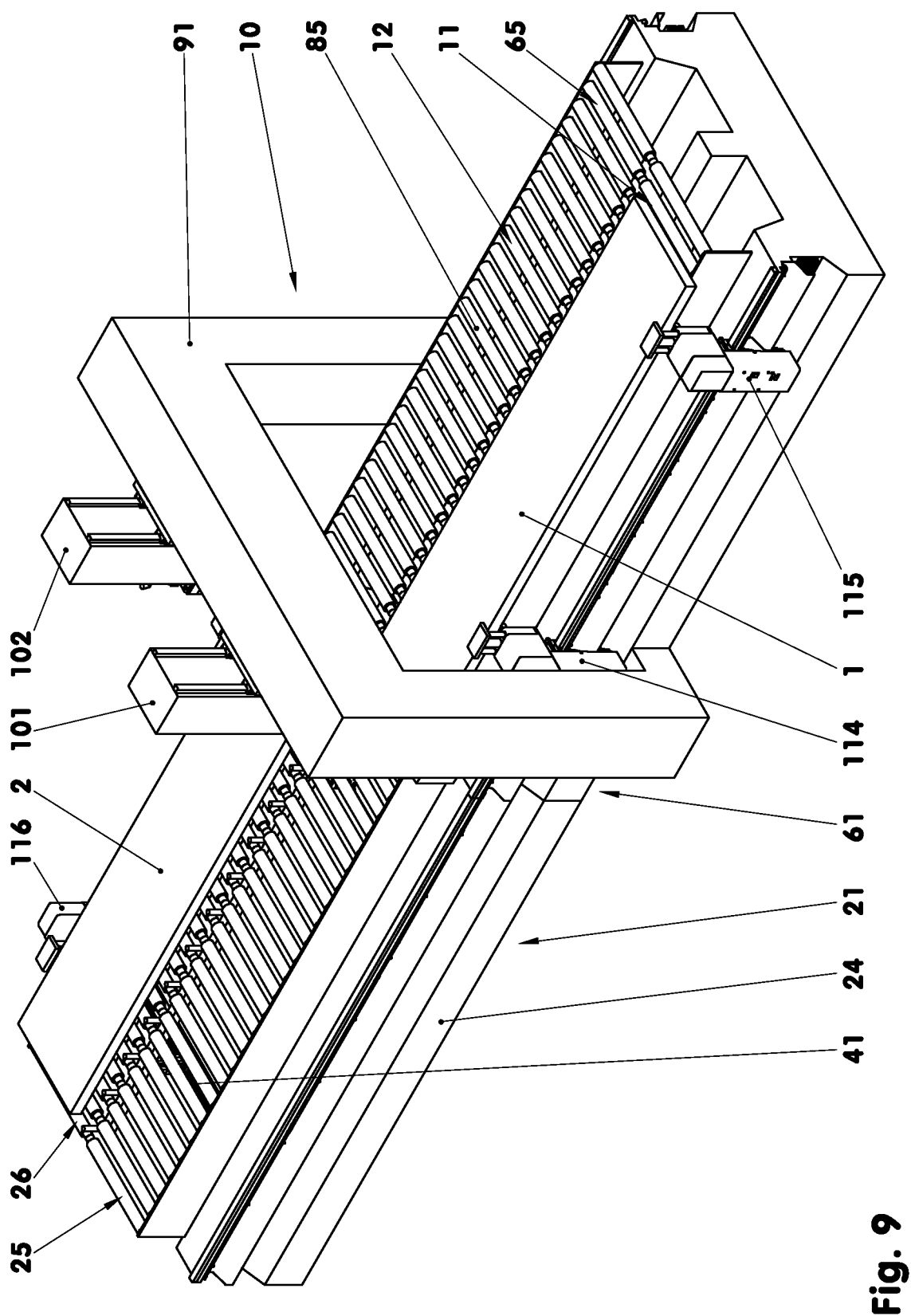
FIG. 9: Variant of the manufacturing cell.
Figure 10:
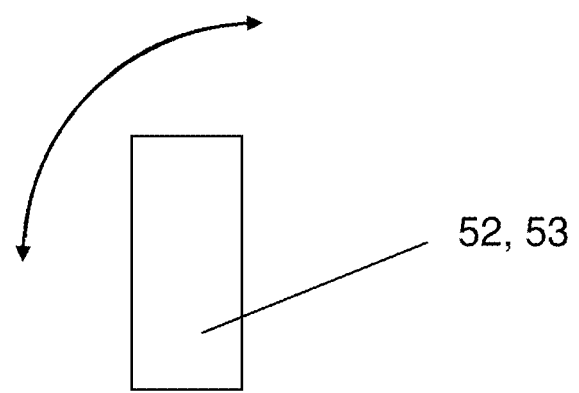
FIG. 10: Tiltable stop device.

FIG. 9 shows a variant of a manufacturing cell (10). Like the manufacturing cell (10) shown in FIGS. 1-8, this has two workpiece paths (11, 12). The workpiece supply (21) is, for example, identically constructed as described in connection with the first embodiment.

The workpiece carriages (114-117) can be equipped with gripping units (131), the lower clamping jaw (134) of which is arranged in a stationary manner relative to the housing (118). The clamping plane of such lower clamping jaw (134) lies in the conveying plane, for example. The upper clamping jaw (133) is adjustable relative to such lower clamping jaw (134).

The machine tool (61) of such exemplary embodiment has a fixed tool carrier (91) in the form of a tool gantry (91) that supports the tool units (101, 102). In this exemplary embodiment, the tool carrier (91) can also be formed to be L-shaped. The workpiece table (65) consists of support rollers (85), which are arranged in a manner parallel to one another and offset in the longitudinal direction. The upper tangential plane of the support rollers (85), for example, coincides with the conveying plane. Vertically below the active tools of the tool units (101, 102), for example, there is a gap between the support rollers (85). In this exemplary embodiment, too, both the load-bearing rollers (27) and the support rollers (85) can be formed to be rigid or rotatable.

The supply of the workpieces (1, 2) takes place as described above. The workpiece (1; 2) picked up by the workpiece carriages (114, 115; 116, 117) is conveyed, for example, along the conveying plane in the conveying direction (112) into the machine tool (61). During machining, the workpiece (1; 2) rests on the support rollers (85). In this exemplary embodiment, the tool units (101, 102) also travel relative to the workpiece (1; 2) at least in the transverse direction (6), in the height direction (7) and in the longitudinal direction (5). For relative movement in the longitudinal direction (5), the workpiece (1; 2) can be displaced relative to the machine bed (64) by means of the workpiece carriages (114, 115; 116, 117).

In this exemplary embodiment, two workpieces (1, 2) lying on the adjacent workpiece paths (11, 12) may be machined in parallel with different work processes.

The conveying of the machined workpieces (1, 2) takes place as described above. If necessary, a workpiece (1; 2) machined in a first clamping operation, for example, can be moved into the workpiece supply (21) by means of the transverse thrust device (41) onto the respective other workpiece path (12; 11), in order to be further machined there by means of a further tool unit (102; 101).

Combinations of the individual exemplary embodiments are also conceivable.

LIST OF REFERENCE SIGNS

1 Workpiece, first workpiece
2 Workpiece, second workpiece
3 Longitudinal side of workpiece
5 Longitudinal direction
6 Transverse direction
7 Height direction
10 Manufacturing cell
11 Workpiece path, first workpiece path
12 Workpiece path, second workpiece path
21 Workpiece supply
22 Workpiece supply region
23 Workpiece supply region
24 Bed
25 Load-bearing roller path
26 Load-bearing roller path
27 Load-bearing rollers
28 Workpiece carriage guide rails
29 Conductor paths
31 Load-bearing roller carrier
32 Transverse guides
33 Toothed rack
41 Transverse thrust device
42 Rake
43 Transverse slide
44 Lifting device
45 Tine carrier
46 Tines
51 Stop bar
52 Stop device
53 Stop device
54 Pin carrier
55 Stop pin
56 Stop pin
57 Cylinder, double-acting
61 Machine tool
62 Working region
63 Working region
64 Machine bed
65 Workpiece table
66 Suction block guide paths
67 Workpiece carriage guide rails
68 Tool gantry guide rails
71 Suction block assembly
72 Support beam
73 Guide assemblies
74 Guide shoes
75 Clamping device
76 Suction elements
77 Suction surface
78 Suction cup
79 Support beam coupling
81 Support device
82 Lifting device
83 Lifting cylinder
84 Guide cylinder
85 Support roller
86 Support beam
91 Tool carrier, Tool gantry
92 Gantry carrier
93 Recirculating ball bearing units
94 Central beam
95 Support and guide rails
101 Tool unit, 5-axis head
102 Tool unit, drilling unit
103 Tool unit, gluing unit
104 Edge gluer
105 Cross slide
106 Disk milling cutter
107 Pivot axis
108 Vertical axis
109 Drill and milling tools
111 Conveying direction
112 Conveying direction, first conveying direction
113 Second conveying direction
114 Workpiece carriage
115 Workpiece carriage
116 Workpiece carriage
117 Workpiece carriage
118 Housing
121 Guide unit
122 Recirculating ball bearing unit
125 Drive unit
126 Power and signal supply
127 Drive wheels
131 Gripping unit
132 Parallel gripping device 133 Clamping jaw, top
134 Clamping jaw, bottom
141 Coupling
142 Plunger
143 Plug

The invention claimed is:

1. A manufacturing cell (10), comprising:
a machine tool (61) that has
   a machine bed (64),
   two workpiece paths (11, 12) oriented in a longitudinal direction (5) adjacent one another,
   at least two tool units (101; 102; 103), and
   a tool carrier (91) carrying the at least two tool units (101; 102; 103),
wherein each of the at least two tool units (101; 102; 103) can be displaced relative to the machine bed (64) at least in a transverse direction (6) oriented normal to the longitudinal direction (5) and in a vertical direction (7) oriented normal to these two directions (5, 6),
wherein at least one workpiece carriage (114; 115; 116; 117) per each of the two workpiece paths (11, 12) can be displaced along the machine tool (61) in the longitudinal direction (5), and
wherein each of the at least two tool units (101; 102; 103) can be displaced in the longitudinal direction (5) relative to the machine bed (64) and/or wherein the workpiece carriages (114, 115; 116, 117) can be displaced in the longitudinal direction (5) relative to each of the at least two tool units (101; 102; 103),
wherein the tool carrier (91) overhangs or projects beyond the two workpiece paths (11, 12),
wherein at least one of the at least two tool units (101; 102; 103) can be used to machine a workpiece on a first of the two workpiece paths (11) and to machine a further workpiece on a second of the two workpiece paths (12),
wherein the two workpiece paths (11, 12) each have a respective workpiece supply region (22; 23) of a workpiece supply (21) and a respective working region (62; 63) of the machine tool (61),
wherein a lowerable transverse thrust device (41) is arranged below the workpiece supply regions (22; 23) and configured to move the workpiece or the further workpiece in the transverse direction (6) towards the at least one workpiece carriage (114; 115; 116; 117) of the respective workpiece path,
wherein each of the workpiece carriages (114; 115; 116; 117) can be displaced along the workpiece supply (21) in the longitudinal direction (5), and
wherein the workpiece supply (21) has at least one lowerable or tiltable stop device (52; 53) per each of the two workpiece paths (11; 12).

2. The manufacturing cell (10) according to claim 1, wherein the at least one workpiece carriage (114; 115; 116, 117) of each of the two workpiece paths (11; 12) can be displaced to pass through a space between the machine bed (64) and the tool carrier (91).

3. The manufacturing cell (10) according to claim 1, wherein the tool carrier (91) is designed as a tool gantry (91).

4. The manufacturing cell (10) according to claim 1, wherein the at least one workpiece carriage (114; 115; 116; 117) of each of the two workpiece paths (11, 12) has a drive unit (125) and a gripping unit (131) for gripping a workpiece (1; 2).

5. The manufacturing cell (10) according to claim 1, further comprising two workpiece tables (65), each of the two workpiece tables (65) comprising support rollers (85),
wherein a respective one of the two workpiece tables (65) is arranged in each of the working regions (62; 63) of the machine tool (61).

6. The manufacturing cell (10) according to claim 5, wherein at least one of the support rollers (85) of at least one of the two workpiece tables (65) is part of a suction block assembly (71) with height-adjustable suction elements (76).

7. The manufacturing cell (10) according to claim 6, wherein the suction block assembly (71) can be displaced in the longitudinal direction (5).

8. The manufacturing cell (10) according to claim 1, wherein the tool carrier (91) can be displaced relative to the machine bed (64) in the longitudinal direction (5).

9. The manufacturing cell (10) according to claim 1, further comprising a stop bar (51) arranged at an end of the workpiece supply (21) proximal to the machine tool (61) and oriented in a transverse direction (6),
wherein the at least one lowerable or tiltable stop device (52; 53) per each of the two workpiece paths (11; 12) comprises at least one lowerable stop device (52; 53) per each of the two workpiece paths (11; 12), and
wherein the at least one lowerable stop device (52; 53) per each of the two workpiece paths (11; 12) are arranged on a pin carrier (54) of the stop bar (51),
wherein each of the at least one lowerable stop device (52; 53) includes a stop pin (55; 56) that is adjustable between a retracted position and an extended position by a double-acting cylinder (57), and
wherein each stop pin (55; 56) is below a conveying plane when in the retracted position.

10. The manufacturing cell (10) according to claim 1, wherein both workpiece supply regions (22, 23) include a single load-bearing roller path (25; 26) each,
wherein each single load-bearing roller path (25; 26) comprises a plurality of load-bearing rollers (27) lying transverse to a conveying direction (112) of the workpieces and parallel to one another,
wherein the lowerable transverse thrust device (41) comprises
   a rake (42) that can be displaced in the transverse direction (6), including a height-adjustable tine carrier (45) and
      a plurality of tines (46) that project upwards from the tine carrier (45);
   two transverse guides (32) anchored in a bed (24) of the workpiece supply (21), each of the two transverse guides (32) carrying a respective transverse slide (43);
   a respective lifting device (44) for lifting the height-adjustable tine carrier (45) of the rake (42) arranged on each of the transverse slides (43), and
wherein each of the tines of the plurality of tines (46) is positioned between a respective two of the load-bearing rollers (27) of each of the load-bearing roller paths (25; 26).

11. The manufacturing cell (10) according to claim 10,
wherein the bed (24) of the workpiece supply (21) has external workpiece carriage guide rails (28) and conductor paths (29),
wherein the external workpiece carriage guide rails (28) and conductor paths (29) continue on the machine bed (64) of the machine tool (61), and wherein the conductor paths (29) supply power to the at least one workpiece carriage (114; 115; 116; 117).

12. The manufacturing cell (10) according to claim 1,
wherein the at least one workpiece carriage (114; 115; 116; 117) is self-propelled and
wherein the at least one workpiece carriage (114; 115) at a first of the two workpiece paths (11, 12) can be displaced independently of the at least one workpiece carriage (116; 117) at a second of the two workpiece paths (11, 12).

13. A manufacturing cell (10), comprising:
a machine tool (61) that has
  a machine bed (64),
  a first workpiece path (11) oriented in a longitudinal direction (5),
  a second workpiece path (12) oriented in the longitudinal direction (5) adjacent to the first workpiece path (11),
  a first tool unit (101),
  a second tool unit (102),
  a third tool unit (103), and
  a tool carrier (91) carrying the first tool unit (101), the second tool unit (102), and the third tool unit (103);
a first workpiece carriage (114) and a second workpiece carriage (115) that can each be longitudinally displaced along the machine tool in the first workpiece path (11);
a third workpiece carriage (116) and a fourth workpiece carriage (117) that can each be longitudinally displaced along the machine tool (61) in the second workpiece path (12);
wherein the first tool unit (101) can be transversely and vertically displaced relative to the machine bed (64),
wherein the second tool unit (102) can be transversely and vertically displaced relative to the machine bed (64),
wherein the third tool unit (103) can be transversely and vertically displaced relative to the machine bed (64),
wherein the tool carrier (91) overhangs or projects beyond the first workpiece path (11) and the second workpiece path (12),
wherein the third tool unit (103) can be used to machine a workpiece on the first workpiece path (11) and to machine a workpiece on a second workpiece path (12),
wherein the first workpiece path (11) has a first workpiece supply region (22),
wherein the second workpiece path (12) has a second workpiece supply region (23),
wherein the first workpiece carriage (114) and the second workpiece carriage (115) can be displaced along the first workpiece supply region (22),
wherein the third workpiece carriage (116) and the fourth workpiece carriage (117) can be displaced along the second workpiece supply region (23),
wherein a lowerable transverse thrust device (41)
  is arranged below the first and second workpiece supply regions (22, 23) and
  is configured to move the workpiece that is on the first workpiece path in the transverse direction toward the first workpiece carriage (114) and the second workpiece carriage (115) and
  is configured to move the workpiece that is on the second workpiece path in the transverse direction toward the third workpiece carriage (116) and the fourth workpiece carriage (117),
wherein the first workpiece supply region (22) has at least one first stop device (52) in the first workpiece path (11), and
wherein the second workpiece supply region (23) has at least one second stop device (53) in the second workpiece path (12).

14. The manufacturing cell (10) according to claim 13,
wherein the first tool unit (101) and the second tool unit (102) are arranged on a first side of the tool carrier (91), and
wherein the third tool unit (103) is arranged on an opposite second side of the tool carrier (91).

* * * * *